Dec. 6, 1927.
J. T. WRIGHT
1,651,795
PROCESS OF MAKING TUBULAR DRILLS
Filed Feb. 21, 1924   2 Sheets-Sheet 1
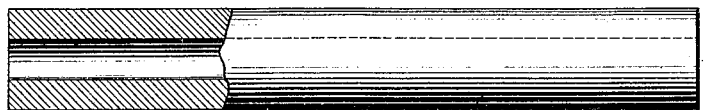
Fig.1
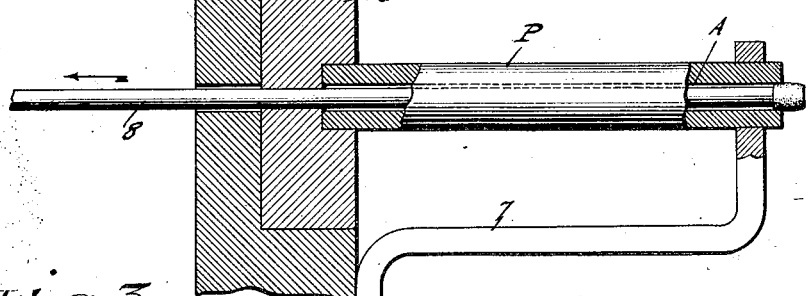
Fig.2
Fig.3
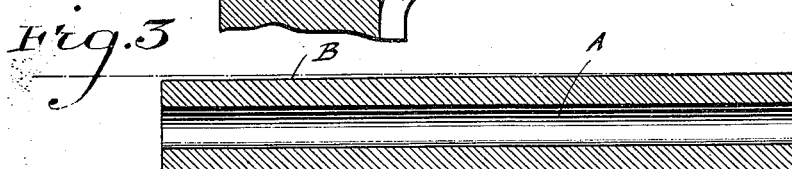
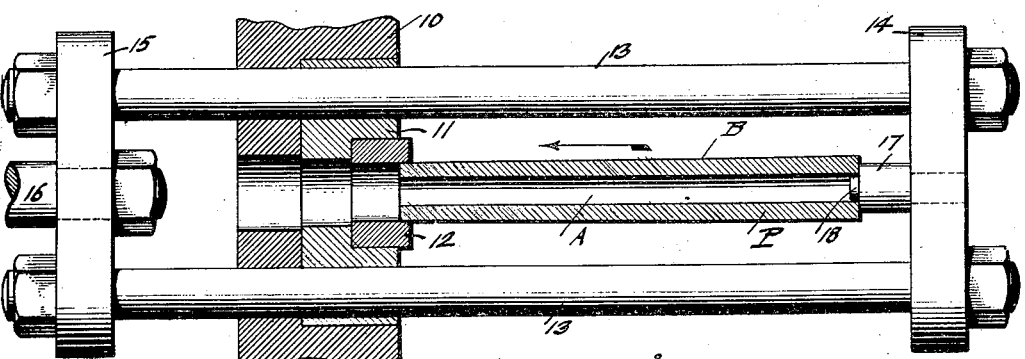
Fig.4
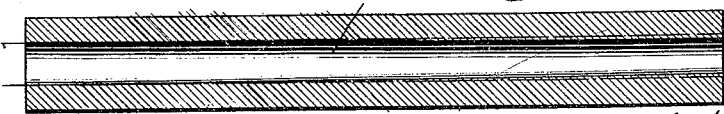
Fig.5
Inventor
Joseph T. Wright.
By Wood & Wood
Attorneys Dec. 6, 1927.

J. T. WRIGHT 1,651,795

PROCESS OF MAKING TUBULAR DRILLS

Filed Feb. 21, 1924   2 Sheets-Sheet 2

Inventor
Joseph T. Wright
By Wood & Wood
Attorneys

Patented Dec. 6, 1927.

1,651,795

UNITED STATES PATENT OFFICE.

JOSEPH T. WRIGHT, OF CINCINNATI, OHIO, ASSIGNOR TO THE J. T. WRIGHT COMPANY, OF CINCINNATI, OHIO, A CORPORATION OF OHIO.

PROCESS OF MAKING TUBULAR DRILLS.

Application filed February 21, 1924. Serial No. 694,449.

This invention relates to a process or method of making a tubular perforator or drilling tool, and to a tool of this character as an article of manufacture, the tool being adapted for drilling holes in paper or like stock, and the perforation drilled being approximately equal to the outside diameter of the drill shank. During the drilling operation the cuttings pass upwardly thru the bore of the drill, as the drill advances thru the stock.

The drill herein is in some respects of the type shown in Letters Patent No. 1,279,495, to A. Dom, Sept. 24, 1918, wherein the bore of the cutter or perforator has an inner tapered delivery passage providing a relief, extending from one end of the drill to the other. The passage extends from the cutting end of the drill to the head end, and is outwardly flared or tapered in different degrees at successive zones or portions of its length to avoid clogging by waste cuttings or chips of the material operated upon. Discharge of waste is thus provided for and the discharge of the cuttings thru the drill bore facilitated, due to the tapered characteristics of the bore.

The cutting edge is beveled in a direction reverse to that of the bore of the drill, and that portion of the bore immediately adjacent the cutting edge is formed with a sharp angle or degree of taper for cupping the cuttings to reduce friction between them and the remaining portion of the bore, which portion assumes a more gradual taper.

It is desirable that the bore be as smooth as possible and in practice the bore is given a high polish to obtain this result. The formation of a smooth, polished, tapered bore of the character above referred to which is free from machine marks, has been found difficult and expensive, and one object of the present invention is to provide a method or process by which the formation of such a bore can be efficiently, quickly and cheaply accomplished. The drill is made from a length of tubing or stock having a straight bore attained by initially tapering the outer surface of the tubular blank, it being possible to easily smooth and polish the surface of a straight bore. The tube initially is machined on its outer surface to an approximate taper necessary for producing the required taper of bore under the present method, resulting in forcing the externally tapered tube through a straight die and smoothing and polishing the straight bore previous to forcing the externally tapered tube through the die.

Passing the externally tapered tube through an appropriate form of die compresses or forces the material inwardly developing an interiorly tapered bore.

Another object of the invention is to provide a drill of the general character described in the above mentioned patent, which in addition to providing a tapered bore, free path for the waste cuttings, and reduction of friction between the said cuttings and the sides of the discharge passage, also provides for the relief of friction between the edges of the openings in the material cut by the tool and the outer surface or shank of the drill or tool, this object being accomplished by tapering the exterior surface of the tool or drill, the taper diameter decreasing or being convergent from cutting to head end of the drill, the direction of taper thus being opposite to that of the bore, which increases from the cutting to the head end. The drill therefore provides for relief of friction between tool and work both at interior and exterior. Other objects and certain advantages will be more fully disclosed in the accompanying drawings forming a part of this specification, and in which:

Figure 1 is a sectional elevation of the blank after boring or drilling, and for the present purpose, may be referred to as representing a length of tubing, with a straight bore, of a determined diameter.

Figure 2 is illustrative of the first step in which the bore is burnished, and shows diagrammatically the apparatus ordinarily used.

Figure 3 is a sectional view of the blank which is tapered exteriorly and represents the final product of the second step.

Figure 4 illustrates the transfer or shifting of the taper from exterior to interior of the blank, which transfer forms the third step, and shows one form of apparatus for performing it.

Figure 5 is illustrative of the product of step three and shows the reverse tapered bore obtained.

Figure 9:
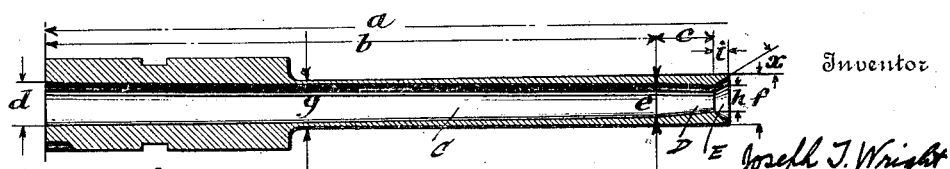
Figure 9 is a view of the finished drill, the products of steps seven and eight, which are respectively machining to form, and exteriorly tapering the outside of the drill in a direction convergent from cutting to head end.

The method or process for producing the article represented in Figure 9, consists, after the tubing bore has been burnished, in externally machining to an appropriate taper longitudinally for a determied length and forcing the externally machined or turned tube through or into a die in series of successive compressing operations.

In practice a piece of straight tubing of the desired length and diameter is selected, and the same is drilled or bored longitudinally, and reamed or polished to provide a straight hole or opening therethrough, as smooth as possible, and of a uniform diameter equal to the diameter required at the largest end of the finished tapered bore of a hollow drill.

In carrying out the polishing or burnishing operation the apparatus diagrammatically represented in Figure 2 is ordinarily employed. The nose of the burnishing machine is indicated at 5, the master bushing for supporting the inner end of the work at 6, the support of the other end of the work at 7, and the burnishing tool attached to the draw bar of the burnishing machine at 8. The tube blank P, bored to allow about .0005 of an inch for burnishing, is placed as shown and the tool 8 reciprocated and if necessary rotated within the bore until the required smooth and uniform bore A is obtained. The diameter of the bore when finished is, as before stated, equal to the diameter required at the largest end of the tapered bore of the finished article.

After the piece is provided with a finished bore of the proper diameter, as above described, the same is exteriorly turned to tapered form, as at B, Fig. 3, the degree of taper substantially corresponding to that desired at the interior, or for the bore of the finished drill. For example, if the bore is to have a taper of .004 of an inch for each inch of length, the ratio of change of diameter to that of unit of length will be substantially similar for the exterior taper. The piece exteriorly tapered at B is represented in Figure 3, and the parallel dot-and-dash lines accentuate the tapered form of the blank.

The next operation is what may be termed the transfer, transposition or shifting of the taper from exterior to interior of the blank, which operation is accomplished as represented in Figure 4, by forcing the work or blank through a straight die, in a direction from end of smaller to end of larger diameter. The numeral 10 indicates a nose of the burnishing machine, 11 a master bushing for supporting the drawing die 12, and guides 13 of the drawing frame, which frame comprises the parallel guides connected at opposite end by cross-heads, respectively 14, 15. The draw bar indicated at 16, is connected with the cross-head 15, and the cross-head 14 has centrally thereof a work supporting pin 17 having a reduced terminal portion 18 as a projection for engagement with the bore of the work. When the work is properly positioned with the end of the smallest diameter of the partially finished blank P engaged within the opening of the drawing die 12, the blank is forced through the die in the direction indicated by the arrow with the result that the outer surface of the piece takes or resumes a cylindrical form, and the initially uniform bore is tapered as at C in a directtion reverse to that of the outer taper end with substantially the same angle or degree of taper as the outer side of the blank originally had. Thus, a polished or finished bore with a taper of the desired angularity is obtained by simply drawing through a straight die the exteriorly tapered blank. The resulting product of the above operation is shown in Figure 5, wherein parallel dot-and-dash lines accentuate the tapered form of the bore C and the reversal of direction of interior taper as compared with the exterior taper of Figure 3.

It will be understood that although the expressions "transportation" and "shifting" have for convenience been used to describe the transfer of the taper from outside to inside of the blank, what actually occurs is that in traveling through the die the metal of the blank is forced inwardly, and inasmuch as the outer diameter gradually increases as the distance from the die increases, the wall of the blank is forced inwardly to correspondingly decrease the bore and give tapered form thereto.

In order to more clearly differentiate the degree of taper, relative dimensions in thousandths of an inch will from time to time be given, it being understood that such dimensions are only relative, and may be varied according to the style of drill in conformity to the character of the material upon which the tool is to be used.

The bore C, shown in Figure 5, is designed to provide a continuous discharge throat of uniform taper, extending throughout the region indicated by b in Figure 9, which figure represents the finished perforator or drill. For one side of drill the interior taper starting at e increases .004 of an inch in diameter for each inch of length and extends to the opposite end of the drill. In a drill having a nominal size of $\frac{7}{32}$ of an inch, the bore diameter at $e$ is .1812 of an inch, and at $d$ .193 of an inch. All measurements herein given will be relative to a drill having a nominal diameter of $\frac{7}{32}$ of an inch.

After the operation described in Figure 4, which forms the tapered bore, the blank is straightened.

The next step is the formation adjacent the cutting edge of the drill, of a tapered portion or zone as a continuation of the other tapered portion, of greater angularity, or in other words, having a greater included angle than that of the taper first formed. This zone or portion of the bore, indicated by $c$, Figure 9, ordinarily has an included angle of 5° and its corresponding diameter measurements at $e$ and at $h$, would be respectively, .1812 of an inch and .161 of an inch.

The purpose of this more sharply tapered zone is to provide a quick release of the cupped chips or waste cuttings, since it is obvious that the cuttings are more closely packed and under greatest tension at or near the cutting end of the drill.

Figure 6:
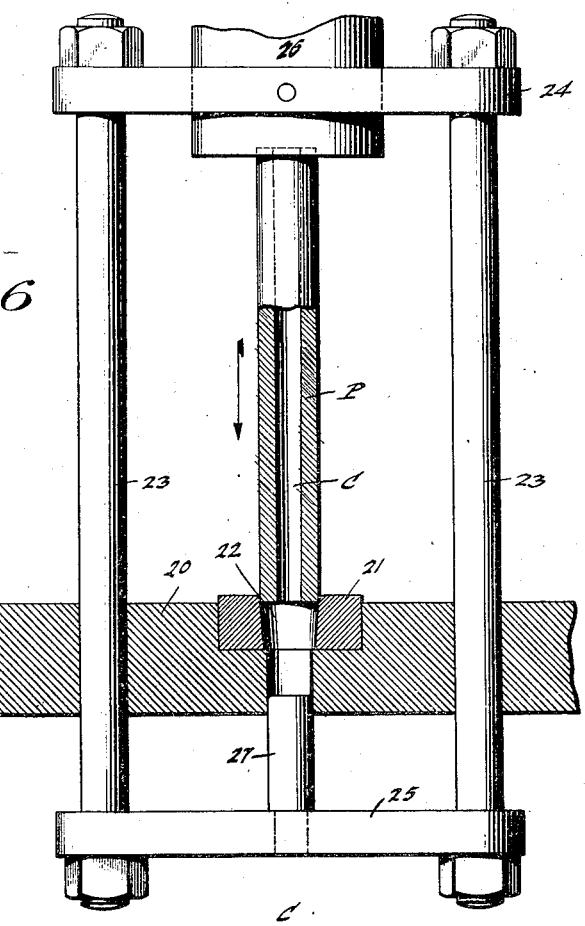
Figure 6 illustrates the fifth step, and apparatus for performing it.

A diagrammatic representation of the apparatus for performing the taper described immediately above, is shown in Figure 6 in which the numeral 20 indicates the arbor press table, 21 the drawing die having the tapered bore 22 of the required angularity, 23 the guide rods, 24 and 25 the cross-heads, 26 the spindle, and 27 the knockout pin.

Figure 7:
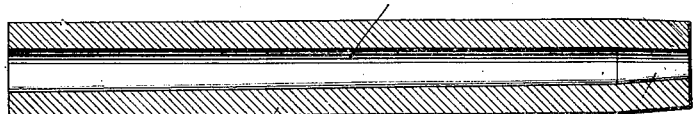
Figure 7 is a view of the product of step five, the terminal exterior and interior beveling or tapering.

After properly placing the work P, the lower end of the same is forced into the die to a given depth after which the spindle is raised and with it the knockout pin 27, which pin releases the work from the die. The angularity of the interior taper formed will be substantially that of the die bore 22, when the piece is forced into the die a predetermined depth. The product of this operation is shown in Figure 7 wherein the tapered bore portion is indicated at D.

Figure 8:
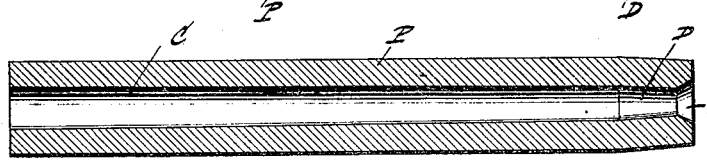
Figure 8 shows the product of step six, terminal center boring.

After the above operation the blank is centered, tapered or countersunk as indicated at E, Figure 8, with a 60° centering tool. The angularity of this taper is, however, not always the same. When the tool is to be used for drilling material other than paper, such as cloth or chamois skin, the angle is varied, or, in some cases it may be the reverse of that shown.

The beveled tapered portion D lies immediately above the tapered portion E, which portion E in turn forms a portion of the cutting edge of the drill or perforator. When the cuttings are compressed and cupped in the portion E and when the same reach the line of demarkation between the tapered portions D and E whereat they are cupped to required degree and thereafter remain cupped. The friction of the outgoing waste with the side walls of the bore is thus gradually relieved until the waste is finally discharged at the head end of the drill.

The next step is the machining of the blank to the desired configuration, represented in Figure 9, and the last operation is the tapering of the outer surface from the cutting edge to the point G in a direction opposite to that of the taper C. The outer diameter of the tool at $f$ is .223 of an inch and at $g$ .220 of an inch.

This tapering, from cutting end toward the head end of the tool provides for the relief of friction between the edges of the openings formed by the drill in the material, and the outer surface of the drill and, therefore, the finished tool provides for the relief of interior and exterior friction between work and tool.

Having described my invention, I claim:

1. A process for forming a tubular body having a tapered bore, which consists in machining the outer surface of a tubular blank to a taper appropriate for a definite taper to be provided for the bore and drawing the blank thus exteriorly tapered through a straight die.

2. A process for forming a tubular perforator of the character described, having a tapered burnished bore, which consists in tapering the outer surface of a hollow cylindrical blank, forcing the small taper end of the blank through a die having a cylindrical bore, of substantially the same diameter as that of the small end of the exteriorally tapered blank, forcing the small taper end of the tube into a die tapering in a direction similar to direction of bore taper to form a more abruptly tapered bore portion adjacent the cutting end, reaming axially to form a short tapered bore portion flared toward the cutting end of the drill, and in a direction opposite the first mentioned bore, and then exteriorly reducing the diameter of and tapering the blank in a direction opposite that of the first formed taper bore, and forming a circular cutting edge about the reamed tapered portion, extending away from the circular cutting edge.

3. The process of forming a hollow drill having a highly polished tapered bore consisting in burnishing and polishing the cylindrical bore of a length of tube, machining the external surface of the tube to a taper appropriate for the taper which is to be provided for the bore, and drawing the externally tapered tube through a die.

In witness whereof, I hereunto subscribe my name,

JOSEPH T. WRIGHT.